United States Patent [19]

Rahrig et al.

[11] Patent Number: 4,632,688
[45] Date of Patent: Dec. 30, 1986

[54] APPARATUS AND METHOD FOR TREATING GLASS SHEETS

[75] Inventors: Donald D. Rahrig, Toledo; Richard D. Schave, Perrysburg, both of Ohio

[73] Assignee: Libbey-Owens-Ford Company, Toledo, Ohio

[21] Appl. No.: 796,403

[22] Filed: Nov. 8, 1985

[51] Int. Cl.$^4$ .............................................. C03B 25/06
[52] U.S. Cl. .......................................... 65/29; 65/111; 65/118; 65/160; 65/163
[58] Field of Search .................. 65/29, 111, 119, 118, 65/160, 163

[56] References Cited

U.S. PATENT DOCUMENTS 4,475,937 10/1984 Nitschke ................................ 65/163
4,493,412 1/1985 Krehnovi ............................ 65/163 X Primary Examiner—Arthur Kellogg
Attorney, Agent, or Firm—Marshall & Melhorn

[57] ABSTRACT

An apparatus for synchronizing the movement of glass sheets through a furnace includes a stop for holding the sheets at the entrance to the furnace. An actuator is responsive to a synchronizing signal for moving the stop and releasing the sheet into the furnace. A reference point sensor detects a reference point associated with a rotating conveyor roller adjacent the entrance to the furnace when the reference point is in a predetermined spatial relationship to the glass sheet which is being held at the entrance. Thus, each glass sheet enters the furnace and engages the conveyor rollers in the same position such that any roller corrugation pattern is reproduced in the same position on each glass sheet. When two such glass sheets are laminated together to form a windshield, the roller corrugation patterns can be matched to reduce the optical distortion produced by the corrugation.

22 Claims, 7 Drawing Figures

APPARATUS AND METHOD FOR TREATING GLASS SHEETS

BACKGROUND OF THE INVENTION

The present invention relates generally to an apparatus for synchronizing the movement of glass sheets in a heat treating operation, and more particularly, concerns an apparatus for synchronizing the movement of glass sheets into a furnace such that any distortion pattern formed will be identical on all sheets.

In the known methods of making and forming glass, defects may inadvertently be produced in the glass which render the glass optically imperfect. Defects may also be produced in the glass during subsequent manufacturing operations such as during heat treatment or thermal conditioning in a bending and/or heat strengthening operation, for example. Among the optical imperfections that may be produced is surface distortion. Surface distortion, as the term is used herein, generally refers to variations in surface flatness, i.e., concave and convex portions.

Surface distortion in glass causes the glass surface to reflect a distorted image. For example, convex portions shrink the image and concave portions magnify the image. When a pair of glass sheets having surface distortion are formed into a laminated structure, such as an automobile windshield, and any convex and concave portions do not match or coincide, portions of the facing surfaces will be spaced farther apart than other portions. These variations in spacing tend to produce optical distortion which becomes more pronounced when the windshield is mounted at an angle to the vertical in an automobile.

SUMMARY OF THE INVENTION

The present invention concerns an apparatus for synchronizing the entrance of sheets of glass into a roller hearth furnace. The sheets of glass are carried through the furnace in a horizontal plane on a series of rollers. As each sheet arrives at an entrance to the furnace, a holding mechanism engages the leading edge of the sheet and holds it in position until the detection of a predetermined reference point either on or associated with a continuously rotating roller over which the sheet will pass as it is fed into the furnace. When a sheet is in the holding position and the reference point reaches a predetermined spatial relationship with respect to the glass sheet, the holding mechanism releases the glass sheet which moves forward to engage the rotating roller. Thus, each sheet which enters the furnace is synchronized with the rotation of the following rollers such that any distortion pattern created in the glass sheet by the rollers will be repeated for each and every sheet which passes through the furnace.

Therefore, when any two sheets that have undergone heat treatment in a roller hearth furnace are laminated together to form, for example, an automobile windshield, the roller distortion or corrugations will line up thereby minimizing the optical distortion present. Several methods of actuating the holding mechanism are disclosed such as a cam actuated lever system and a light source and photocell controller solenoid actuator.

BRIEF DESCRIPTION OF THE DRAWINGS

The above, as well as other advantages of the present invention, will become readily apparent to one skilled in the art from reading the following detailed description in conjunction with the attached drawings in which.

DESCRIPTION OF THE PREFERRED EMBODIMENT

Figure 1:
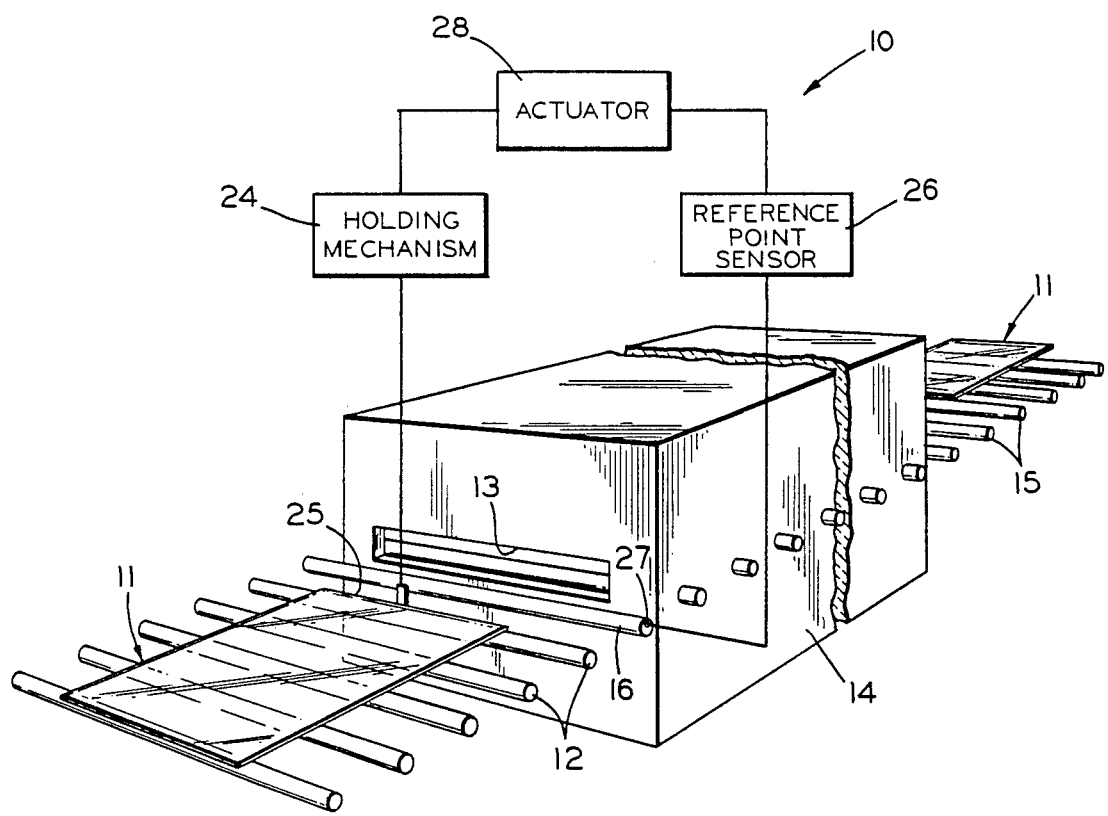
FIG. 1 is a combined perspective view and block diagram illustrating the synchronization apparatus of the present invention in conjunction with a glass heat treating system.

Referring to FIG. 1, there is shown an apparatus 10 for synchronizing the movement of glass sheets through a furnace. Individual sheets of glass 11 are carried on a plurality of conveyor rollers 12 to an entrance 13 of a furnace 14. After being heated, the glass sheets 11 exit the furnace on another plurality of conveyor rollers 15 and may be immediately subsequently bent on a bending apparatus, for example, a press bending apparatus of the type shown in U.S. Pat. No. 3,265,484, and then cooled to anneal or heat strengthen the glass. The rollers 12 and 15 are typically coupled to a conveyor drive means (not shown) capable of suitably driving the rollers which support and move the glass sheets through the furnace 14. A conveyor roller 16 is positioned adjacent the entrance 13 of the furnace 14 and is representative of the plurality of rollers in the furnace for moving the glass sheets 11 from the entrance 13 to the exit. The roller 16 and the rollers in the furnace may be driven by the same conveyor drive means as the rollers 12 and 15 or by a separate drive means.

Figure 2:
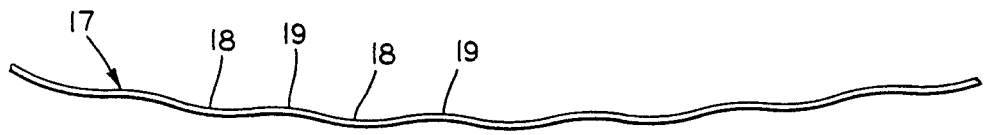
FIG. 2 is an edge view of a bent glass sheet which has been heat treated in a roller hearth furnace showing the roller corrugations formed therein.

As the glass is heated, the rollers in the furnace 14 can cause roller corrugation wherein a series of alternating convex and concave portions are formed along the glass sheet. This form of distortion can generate many patterns particularly if the rollers are not mounted on their true centers or there is an improper alignment. The roller distortion is more pronounced in thinner sheets of glass which are typically laminated together after a bending operation to form automobile windshields. There is shown in FIG. 2 a glass sheet 17 after heat treatment and bending displaying an exaggerated form of roller distortion having alternating concave 18 and convex 19 portions as viewed from a side edge.

Figure 3:
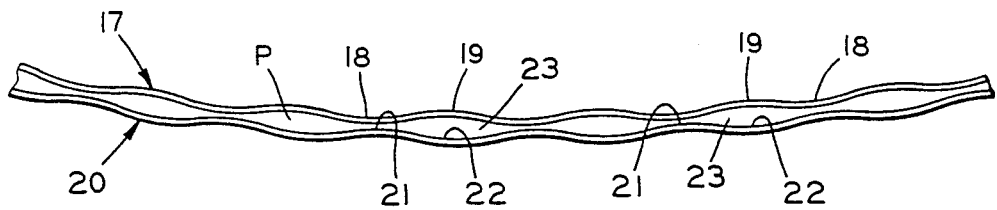
FIG. 3 is an edge view of a pair of bent glass sheets which have been heat treated in a roller hearth furnace and subsequently bent and laminated together in which the roller corrugations have been mismatched.

Prior to the present invention, increased optical distortion caused by improper alignment of the corrugations has been a major concern when pairing sheets for lamination. There is shown in FIG. 3 the sheet 17 laminated through an interposed sheet P of polyvinyl butyral to a second similar glass sheet 20 wherein the corrugations do not match up properly. The concave portions 18 and convex portions 19 of the sheet 17 are aligned with the convex portions 21 and concave portions 22 respectively, as viewed from a side edge of the assembly. Thus the portions 18 and 21 are spaced closer together than the portions 19 and 22 forming pockets 23 in the laminated assembly. The pockets 23 generate optical distortion which, as previously mentioned, is particularly pronounced when the assembly is utilized as an automobile windshield wherein it is mounted at an angle to the occupant's line of sight.

Figure 4:
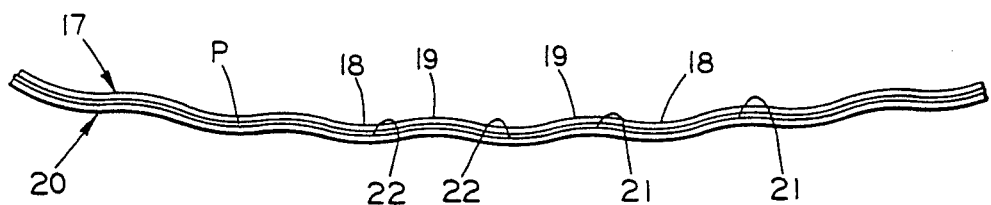
FIG. 4 is an edge view of a pair of bent glass sheets which have been heat treated in a roller hearth furnace according to the present invention and subsequently laminated together, in which the corrugations have been matched.

There is shown in FIG. 4 a laminated windshield structure wherein the glass sheets 17 and 20 have been matched or aligned such that the portions 18 and 19 are adjacent the portions 22 and 21 respectively. Such an alignment greatly reduces the optical distortion present in such a laminated assembly.

Since the rollers are fixed with respect to the path of travel of the glass sheets 11, the same roller corrugation pattern could be produced in each glass sheet in the same position if the movement of the glass sheet could be synchronized with the rotation of the rollers. The present invention accomplishes this result by holding each glass sheet at the entrance to the furnace and only releasing that glass sheet upon the sensing that a reference point either on or associated with the roller 16 at the entrance 13 is in a predetermined spatial relationship to the waiting glass sheet 11. The present invention accomplishes this result through the use of the apparatus shown in FIG. 1. A holding mechanism 24 retains the glass sheet 11 in a fixed position on the rollers 12 adjacent the entrance to the furnace. Conveniently, the holding mechanism 24 engages a leading edge 25 of each of the sheets 11 to prevent forward movement into the entrance 13 of the furnace 14. However, any method for holding the sheet 11 in position could be utilized. A reference point sensor 26 senses the position of a reference point 27 on the rotating roller 16 when the reference point 27 is in a predetermined spatial relationship to the leading edge 25 of the glass sheet 11. Upon sensing the reference point 27, the reference point sensor 26 sends a signal to an actuator 28 which in turn actuates the holding mechanism 24 to release the glass sheet 11 into the entrance 13 of the furnace 14. Thus, the leading edge 25 of each of the glass sheets 11 will engage the same area on the outer surface of the roller 16 as the sheets enter the furnace 14 and will engage each of the rollers in the furnace in the same areas. The result will be the formation of the same roller corrugation pattern in each of the glass sheets 11.

Figure 5:
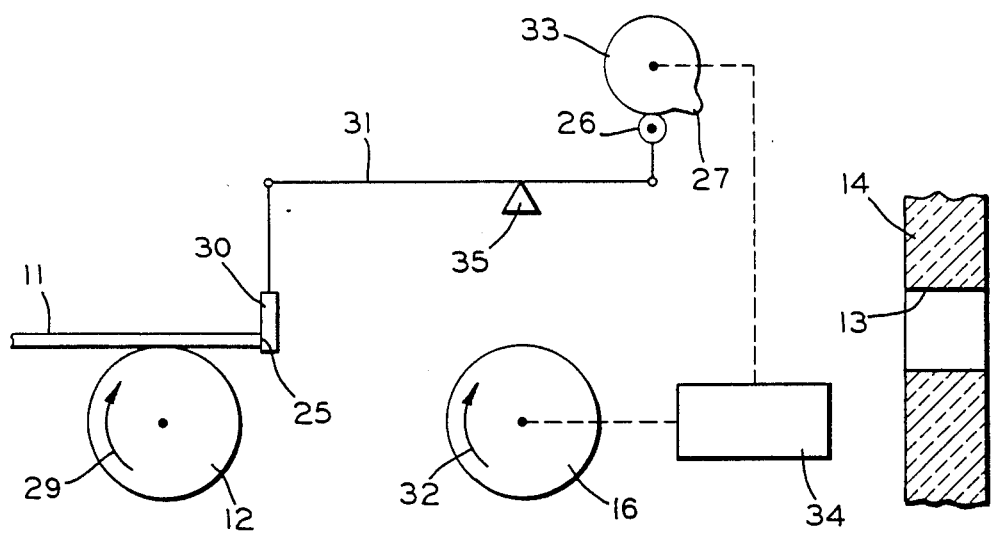
FIG. 5 is a schematic representation of the mechanism of FIG. 1 for synchronizing the movement of glass sheets through a furnace in a heat treating operation.

There is shown in FIG. 5 one form of an apparatus for synchronizing the movement of glass sheets in accordance with the invention. The glass sheet 11 is resting upon an upper surface of the roller 12 which rotates in the direction of the arrow 29. The holding mechanism includes a gate 30 or stop which engages the leading edge 25 of the glass sheet 11. The stop 30 is mechanically connected to one end of a lever arm 31. The other end of the lever arm 31 is mechanically connected to the reference point sensor 26 which can be a cam follower. The roller 16 rotates in the direction of the arrow 32. A cam 33 is mechanically coupled to a reduction drive 34 which is also coupled to the roller 16 for rotation therewith. The reduction drive has a gear ratio which results in one rotation of the cam 33 per a predetermined number of rotations of the roller 16. A lobe formed on the cam 33 can be, for example, the reference point 27. When the lobe 27 rotates to the position of the cam follower/reference point sensor 26, the lever arm 31 pivots about a pivot point 35 causing the stop 30 to move out of the path of the glass sheet 11 and allow the glass sheet 11 to be moved into engagement with the outer surface of the roller 16. A mechanism (not shown) can be provided for maintaining the gate 30 in a raised position until the glass sheet has passed at which time the gate 30 is lowered. For example, the cam lobe 27 could be extended around the cam 33 a distance sufficient to maintain the lever arm 31 in the actuated position. In the alternative, a latching mechanism could be provided which would then be released by a second cam lobe positioned on the cam 33. The length of the glass sheets 11 and the spacing between the sheets will determine the gear ratio required for the reduction drive 34.

Figure 6:
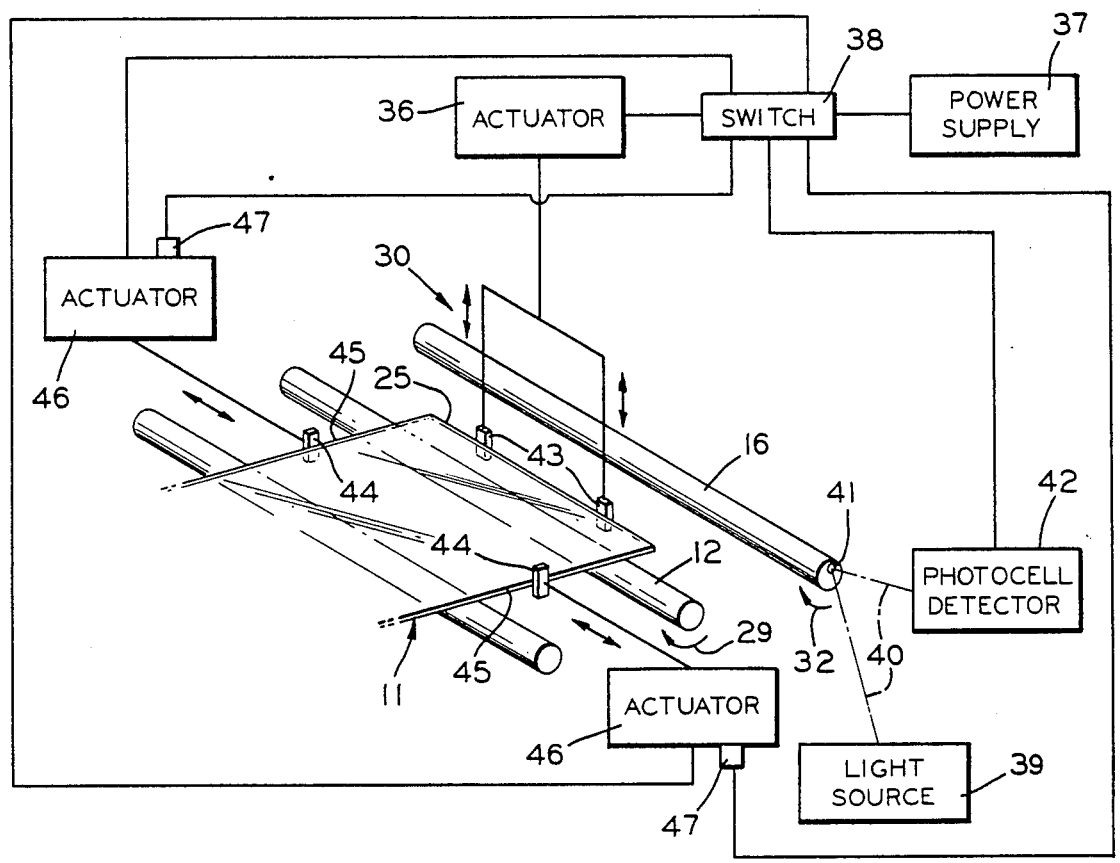
FIG. 6 is a combined perspective view and schematic diagram of an alternate embodiment of the mechanism of FIG. 5 for synchronizing the movement of glass sheets through a furnace in a heat treating operation.

There is shown in FIG. 6 an alternative embodiment of the apparatus for synchronizing according to the present invention. The stop 30 is mechanically connected to an actuator 36 which could be a solenoid actuated plunger. The power for the solenoid coil (not shown) is provided by a power supply 37 connected through a switch 38. The switch is normally open and the plunger of the actuator 36 can be spring loaded to position the stop 30 in the holding position as shown. A signal generating means including a light source 39 is positioned to project a beam of light 40 against an end surface of the roller 16. When the beam of light 40 strikes a reflective surface 41 positioned at a predetermined reference point, the beam of light 40 is reflected to a photocell detector 42. When the beam of light 40 is received, the photocell detector 42 generates a signal to the switch 38 to close the switch and supply power to the actuator 36. The actuator 36 then raises the stop 30 permitting the glass sheet 11 to proceed into the furnace. The switch 38 can include a timer which will remove the power from the actuator 36 when the glass sheet has passed. In the alternative, the switch 38 could latch in the closed position in response to a first signal from the photocell detector 42 and be responsive to a second signal for disconnecting the power supply. In such a case, a timer can be programmed or a second reflective surface can be positioned on the roller 16 to provide such a second signal.

Not only is it important to align the leading edge 25 of the glass sheet 11, but the sheet 11 must also be aligned with respect to the path of travel on the rollers. Thus, the stop 30 includes a pair of spaced apart stop members 43 which engage the front edge 25 and a pair of stop members 44 which engage the side edges 45 of the glass sheet 11. Each of the stop members 44 is mechanically coupled to an actuator 46 for movement toward and away from the edges 45. The actuators can be powered by the power supply 37 through the switch 38 with the stops 43 lowered first and then the stops 44 moved into position at the edges 45 to align the sheet 11. Various types of conventional sensors can be utilized to sense that the glass sheet is aligned and ready to be released into the furnace. For example, a microswitch 47 on the actuator 46 can signal to the switch 38 that the sheet 11 is ready to be released.

Figure 7:
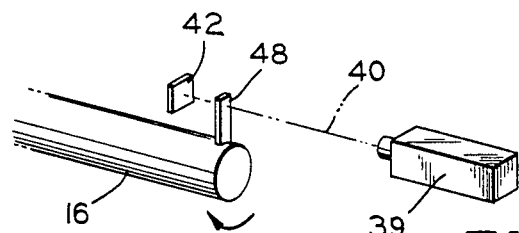
FIG. 7 is a combined perspective view and schematic diagram of an alternate embodiment of a portion of the mechanism shown in FIG. 6.

In the embodiment just described, the beam of light 40 is reflected from a reflective surface 41 on the roller 16 to a photocell detector 42 to generate a signal to the switch 38. As illustrated in FIG. 7, it is entirely within the purview of the invention that the signal generating means can be suitably arranged wherein the beam of light 40 projects directly on the photocell detector 42 and is intermittently interrupted by a projecting member 48 extending outwardly of the rotating roller 16 to send a signal to the switch 38. Or, if desired, the reflective surface 41 can be positioned on the projecting member 48 instead of on the roller 16 itself as shown in FIG. 6 and the beam 40 reflected to the photocell detector 42 from the projecting member.

The mechanisms shown in FIGS. 5, 6, and 7 are only representative of several devices which could be utilized for synchronizing the movement of sheets of glass into a furnace in coordination with the rotation of the rollers in the furnace. For example, the signal generating means can be any type of conventional non-contacting sensor or detector and the actuator 36 can be a fluid actuator responsive to a signal received from the switch 38. In accordance with the provisions of the patent statutes, the principles and mode of operation of the present invention have been discussed in what is considered to represent its best embodiment. However, it should be understood that the invention may be practiced otherwise than as specifically illustrated and described without departing from its spirit or scope.

We claim:

1. A method for synchronizing the movement of the leading edge of a glass sheet entering a roller hearth furnace with a predetermined point on a rotating roller over which said glass sheet will pass comprising:
   a. identifying a reference point associated with said rotating roller;
   b. holding said glass sheet at a preselected location adjacent said rotating roller; and
   c. releasing said glass sheet from said preselected location when said reference point is in a predetermined spatial relationship with respect to said glass sheet leading edge whereby said glass sheet will engage said rotating roller at said predetermined point thereon.

2. A method for reducing thickness variations in a laminated assembly including glass sheets heat treated in a roller hearth furnace comprising the steps of:
   a. identifying a reference point associated with a rotating roller over which a glass sheet will pass;
   b. holding said glass sheet at a predetermined point adjacent said rotating roller; and
   c. releasing said glass sheet from said predetermined point when said reference point is in a predetermined spatial relationship with respect to said glass sheet.

3. The method according to claim 2 wherein said rotating roller is located adjacent an entrance to a furnace for heating said glass sheet.

4. The method according to claim 2 wherein steps b. and c. are repeated for each of a plurality of glass sheets.

5. In a method of heat treating glass sheets for subsequent lamination in which single glass sheets pass through a furnace in sequence on a plurality of rollers, the improvement comprising the steps of:
   a. holding each of said single glass sheets at an entrance to a furnace;
   b. sensing a reference point associated with a rotating roller adjacent said entrance; and
   c. releasing one of said single glass sheets into the furnace each time said reference point is in a predetermined spatial relationship with respect to said entrance and/or said one single glass sheet.

6. The method according to claim 5 wherein step a. is performed by engaging a leading edge of each of said single glass sheets with a stop and step c. is performed by disengaging said stop from said leading edge.

7. The method according to claim 5 wherein step a. includes aligning each of said single glass sheets in a predetermined position at said entrance.

8. The method according to claim 7 wherein step a. is performed by engaging a leading edge and opposite side edges of each of said single glass sheets with individual stops.

9. The method according to claim 5 wherein said reference point is located on an end of said rotating roller and adjacent the circumference thereof.

10. An apparatus for reducing thickness variations in a laminated assembly including glass sheets heat treated in a furnace in which single glass sheets pass through the furnace in sequence on a plurality of rollers comprising:
    means for holding each of a sequence of glass sheets at an entrance to a furnace;
    means for defining a reference point associated with a rotating roller adjacent said entrance of the furnace; and
    means for sensing the position of said reference point and for actuating said means for holding to release one of said glass sheets each time said reference point is in a predetermined spatial relationship with respect to said entrance and said glass sheet.

11. The apparatus according to claim 10 wherein said means for holding includes a stop for engaging a leading edge of each of said glass sheets in sequence and for disengaging from said leading edge upon actuation by said means for sensing and for actuating.

12. The apparatus according to claim 10 wherein said means for defining a reference point includes a cam coupled to an end of said rotating roller for corotation therewith.

13. The apparatus according to claim 10 wherein said means for defining a reference point includes a source of a beam of light and reflector means attached to an end of said rotating roller for corotation therewith through said beam of light.

14. The apparatus according to claim 10 wherein said means for sensing and for actuating includes a cam follower connected to one end of a lever and responsive to said means for defining a reference point for actuating said lever, an opposite end of said lever being connected to said means for holding whereby one of said glass sheets is released upon actuation of said lever.

15. The apparatus according to claim 10 wherein said means for sensing and for actuating includes a photocell responsive to a beam of light generated by said means for defining a reference point for generating an actuation signal, and further includes an actuator responsive to said actuation signal for actuating said means for holding whereby one of said glass sheets is released.

16. The apparatus according to claim 15 wherein said actuator includes a normally open switch connected between a power supply and a solenoid operated plunger, said plunger being connected to said means for holding and said switch being responsive to said actuation signal for connecting the power supply to the solenoid to actuate the plunger and said means for holding.

17. An apparatus for controlling the movement of glass sheets through a furnace comprising:
    a stop means for holding a glass sheet at an entrance to a furnace;

means for defining a reference point associated with a roller adjacent said entrance to the furnace; and means responsive to the position of said reference point for controlling said stop means to release said glass sheet into said furnace when said reference point is in a predetermined spatial relationship to said glass sheet.

18. The apparatus according to claim 15 wherein said means for defining a reference point includes a cam coupled to an end of said roller and wherein said means for controlling includes a cam follower responsive to said cam for actuating said stop means.

19. The apparatus according to claim 18 including a reduction drive coupled between said roller and said cam for rotating said cam one rotation per a predetermined number of rotations of said roller.

20. The apparatus according to claim 17 wherein said means for defining a reference point includes means for generating a beam of light and wherein said means for controlling includes means responsive to said light beam for actuating said stop means.

21. The apparatus according to claim 17 wherein said means responsive to the position of said reference point is also responsive to the alignment of said glass sheet with respect to said roller for controlling said stop means.

22. The apparatus according to claim 21 wherein said stop means includes stop members positioned to engage a leading edge and opposite side edges of said glass sheet for aligning said glass sheet with respect to said roller.

* * * * *